United States Patent [19]
Nelle

[11] Patent Number: 5,526,706
[45] Date of Patent: Jun. 18, 1996

[54] SEALED ENCODER

[75] Inventor: Günther Nelle, Bergen, Germany

[73] Assignee: Johannes Heidenhain GmbH, Traunreut, Germany

[21] Appl. No.: 312,574

[22] Filed: Sep. 27, 1994

[30] Foreign Application Priority Data

Oct. 2, 1993 [DE] Germany ............ 43 33 651.5

[51] Int. Cl.⁶ .................................. H05K 9/00
[52] U.S. Cl. ................................. 73/865.8
[58] Field of Search ............... 73/866.5, 865.8; 277/80, 205, 236, 901, DIG. 6; 174/35 R, 35 GC

[56] References Cited

U.S. PATENT DOCUMENTS

| 4,057,258 | 11/1977 | Ernst et al. | |
| 4,288,081 | 9/1981 | Sado | 277/901 |
| 4,510,345 | 4/1985 | Costa et al. | 174/35 R |
| 4,823,229 | 4/1989 | Waterland, III | 277/901 |
| 5,107,071 | 4/1992 | Nakagawa | 174/35 GC |

FOREIGN PATENT DOCUMENTS

| 1548871 | 9/1969 | Germany . |
| 2846768 | 4/1980 | Germany . |
| 3215334 | 6/1983 | Germany . |
| 3930377 | 3/1990 | Germany . |
| 4101579 | 7/1992 | Germany . |

Primary Examiner—Robert Raevis
Attorney, Agent, or Firm—Anderson Kill Olick & Oshinsky

[57] ABSTRACT

A sealed encoder for measuring a relative position of two objects movable relative to each other and including a housing connected with one of the objects, an entrain member, which is located in a slot formed in the housing, for supporting a position-measuring device and connected with another of the objects, and resilient strip-shaped sealing elements formed of an electroconductive non-metallic material.

9 Claims, 1 Drawing Sheet

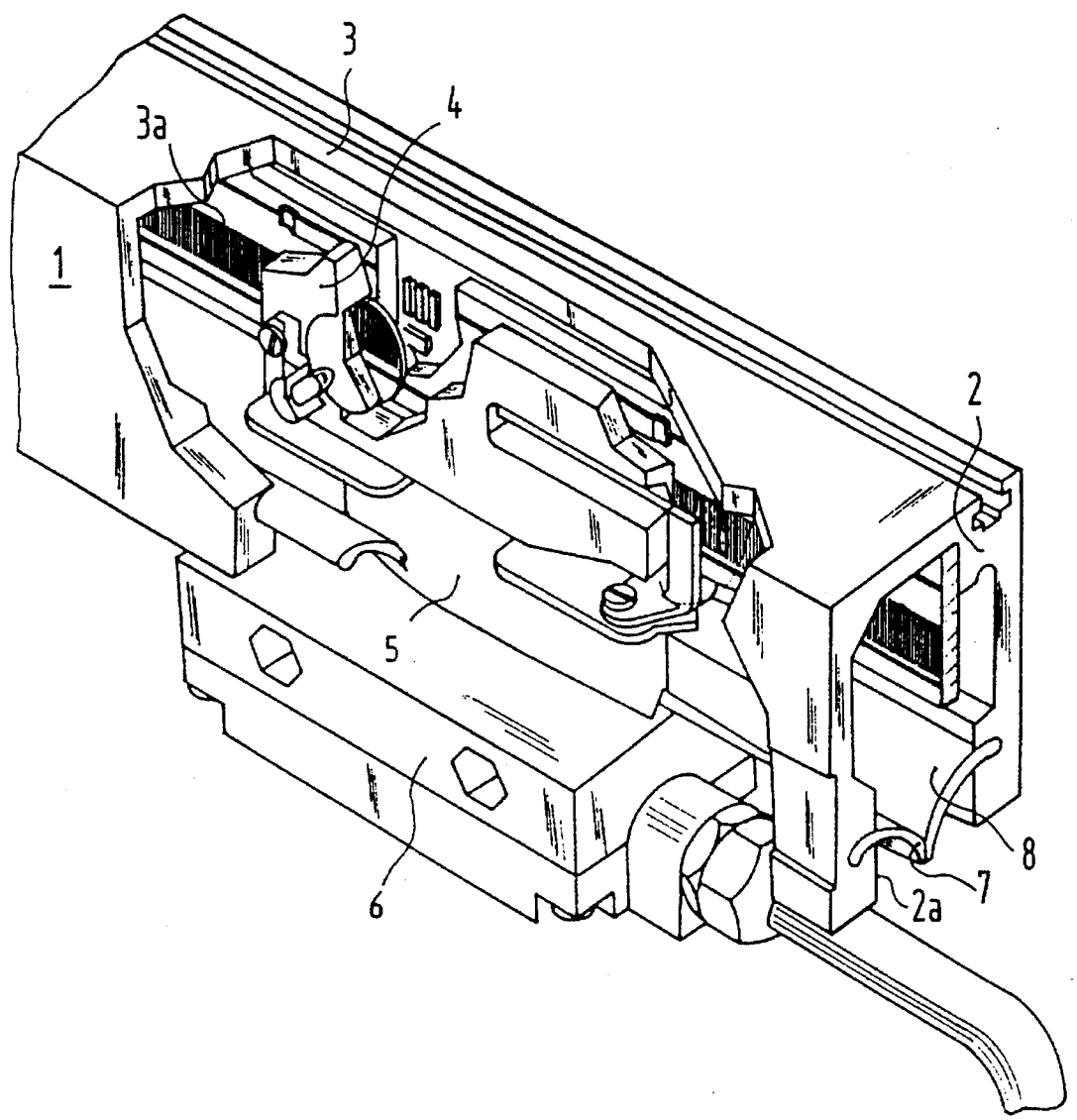

SEALED ENCODER

BACKGROUND OF THE INVENTION

The present invention relates to a sealed encoder for measuring a relative position of two objects movable relative to each other and including a hosing connected with one of the objects and having, in at least one side thereof, a slot extending in a direction of movement of the two objects relative to each other, an entrain member extending in the slot for supporting a position-measuring device and connected with another of the objects, and resilient means extending along the slot for sealing same with the entrain member extending into the slot through the resilient means formed as strip-shaped lips.

Such encoders can be formed as linear or angle encoders functioning in accordance with different physical principles. The encoders are being mounted on different machines for determining a relative position of two or more machine parts.

In sealed encoders, the housing, as known, has a slot into which projects an entrain member that connects a scanning device, located inside the housing, with a mounting block located outside the housing.

When a sealed encoder is used, for example, determining a relative position (movement) of a machine bed and a machine slide movable relative to each other, the relative movement is transferred to the measuring graduation or the scanning device supported by the entrain member, with the entrain member being relatively movable in the movement direction inside the slot.

For protecting the highly sensitive graduation, the housing slot should be sealed as tightly as possible, and the possibility of penetration inside the housing should be provided only in the region of the entrain member.

Such an encoder is shown, e.g., in German Patent No. 2,846,768, in which a scale and a scanning device are located inside a hollow member having a slot extending in a measurement direction. The slot is sealed with sealing elements, which are formed as rubber or plastic lips. The entrain member extends into the inner space of the housing through sealing lips and connects the scanning device with one of the part's relative position or movement of which is measured.

German Patent No. 1,548,871 discloses an encoder in which metallic sealing elements are provided for sealing the housing slot. However, their stiffness is too high to make their adaptation to the entrain member possible.

German Patent No. 3,215,334 discloses an encoder with resilient sealing elements made of a non-metallic material formed of different fibers. This material can include metallic fibers to provide shielding against electromagnetic interference.

German Publication DE 39 30 377A1 discloses a separate sealing element which is arranged between the housing, and associated with the housing cover. This element can be formed of non-metallic material, the outer surface of which is provided with an electroconductive layer.

An object of the invention is a sealed encoder of the above-described type, in which the sealing of the housing slot is effected with mechanically and electrically-resistant sealing elements with an adequate electrical shielding capability.

SUMMARY OF THE INVENTION

This and other objects of the invention, which will become apparent hereinafter, are achieved by forming the sealing strip-shaped elements, which form the resilient sealing means, of an electroconductive non-metallic material, preferably plastic or rubber material, which is made electroconductive by addition of electroconductive particles.

By forming the sealing strip-shaped elements or lips of an electroconductive material, they can be made current-carrying. The current, which flows through the sealing elements or lips, creates a magnetic field the flux of which serves as an additional sealing medium. The flowing-through current also heats the sealing elements whereby the humidity inside the encoder can be controlled within certain limits.

It is especially advantageous when the housing is formed of metal or an electroconductive non-metallic material, and forms with the electroconductive sealing elements, a Faraday shield.

The encoder, according to the present invention, may also be electrically connected with the machine parts, the relative position or movement the encoder measured.

Also, the sealing elements can be made electroconductive by providing a resilient electroconductive cover for the sealing elements.

BRIEF DESCRIPTION OF THE DRAWINGS

The features and objects of the present invention will become more apparent, and the invention itself will be best understood from the foregoing detailed description of the preferred embodiment when read with reference to the accompanying drawing, wherein:

Single FIGURE shows a perspective cut-out view of a sealed encoder, according to the present invention, with safety lips.

DETAILED DESCRIPTION OF THE PREFERRED EMBODIMENT

A linear encoder 1 shown in the drawing Figure includes a light-metal housing 2 in which a graduation carrier member 3 is secured in per se known manner. Because the drawing figure shows a cut-out view, a scanning device 4 can be visible. The scanning device 4 scans, in per se known photoelectrical manner, a graduation 3a, which is secured on a graduation carrier member 3. An entrain member 5, which has a cross-section of a twin-edged sword, connects the scanning device 4 with a mounting block 6. The entrain member 5 extends through a longitudinal slot 2a formed in the housing 2 and which is sealed with sealing lips 7 and 8, which form a roof-shaped structure.

The mounting block 6, together with the entrain member 5 and the scanning device 4, is supported on a machine bed of a machine (not shown), in which the relative displacement between the machine bed and the machine slide is measured. The housing 2, together with the graduation carrier member, is supported on the machine slide.

For electrical shielding of the scanning device from interference of external fields, the resilient sealing lips 7 and 8 are formed electroconductive. The sealing lips 7 and 8 are formed electroconductive by admixture of electroconductive particles to the material of the sealing lips. Alternatively, the sealing Lips can be made electroconductive by being covered with a resilient electroconductive cover.

When the electroconductive current is used, the current flow can generate a controllable magnetic field in the sealing lips 7 and 8, whereby a magnetic flux is created in the sealed space, as known. This magnetic flux improves even more the sealing of the sealing space.

The use of electroconductive sealing lips 7 and 8 is especially advantageous when, simultaneously, it is desirable for effecting electrical shielding, that the sealing lips are provided with additional functions such as creating, as it has already been mentioned, a magnetic field and a heating function. With heating, the condensation of moisture in the housing can be influenced within certain limits. This can substantially increase the operational reliability of the encoder.

Of course, the housing 2 can also be made of a non-metallic material. In this case, for improving the electrical shielding, an electroconductive cover can also be used. Alternatively, electroconductive particles can be admixed to the material the housing is made of, in the same manner as it was described with regard to sealing lips.

Though the present invention was shown and described with reference to preferred embodiments, various modifications thereof will be apparent to those skilled in the art and, therefore, it is not intended that the invention be limited to the described embodiments and/or details thereof, and departure may be made therefrom within the spirit and scope of the appended claims.

What is claimed is:

1. A sealed encoder for measuring a relative position of two objects movable relative to each other, said sealed encoder comprising:

a housing connected with one of the objects and having, in at least one side thereof, a slot extending in a direction of movement of the two objects relative to each other;

an member for supporting a position-measuring device and connected with another of the objects, said entrain member extending in said slot; and resilient sealing means extending along said slot for sealing same, said entrain member extending into said slot through said resilient sealing means, wherein said resilient sealing means comprises resilient sealing unitary strip-shaped elements formed of an electroconductive non-metallic material.

2. A sealed encoder as set forth in claim 1, wherein said electroconductive non-metallic material is a plastic material.

3. A sealed encoder as set forth in claim 1, wherein said electroconductive non-metallic material is a rubber material.

4. A sealed encoder as set forth in claim 1, wherein said non-metallic material is made electroconductive by admixing electroconductive particles thereto.

5. A sealed encoder as set forth in claim 1, wherein said housing is formed of one of metal and an electroconductive non-metallic material and forms, with said electroconductive sealing strip-shaped elements, a Faraday shield.

6. A sealed encoder as set forth in claim 1, wherein said housing and said sealing strip-shaped elements are electrically connected with each other.

7. A sealed encoder as set forth in claim 1, wherein said sealing strip-shaped elements are current-carrying elements.

8. A sealed encoder as set forth in claim 7, wherein said sealing strip-shaped elements are heated by current flowing therethrough.

9. A sealed encoder as set forth in claim 1, wherein said encoder is electrically connected with the objects, which relative position is measured thereby.

* * * * *